United States Patent
Pan et al.

(10) Patent No.: US 8,837,813 B2
(45) Date of Patent: Sep. 16, 2014

(54) MOBILE THREE DIMENSIONAL IMAGING SYSTEM

(75) Inventors: Hao Pan, Vancouver, WA (US); Chang Yuan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 285 days.

(21) Appl. No.: 13/175,166

(22) Filed: Jul. 1, 2011

(65) Prior Publication Data

US 2013/0004058 A1    Jan. 3, 2013

(51) Int. Cl.
| G06K 9/00 | (2006.01) |
| H04N 13/02 | (2006.01) |
| H04N 5/232 | (2006.01) |
| H04M 1/725 | (2006.01) |
| G01B 11/02 | (2006.01) |
| H04N 13/00 | (2006.01) |
| H04N 13/04 | (2006.01) |

(52) U.S. Cl.
CPC ...... *H04M 1/72522* (2013.01); *H04M 2250/52* (2013.01); *H04N 13/0296* (2013.01); *H04M 2250/10* (2013.01); *H04N 5/23216* (2013.01); *H04N 2013/0081* (2013.01); *G01B 11/026* (2013.01); *H04N 13/0239* (2013.01); *H04M 2250/12* (2013.01); *H04N 13/04* (2013.01)
USPC .............................. 382/154; 348/51; 382/103

(58) Field of Classification Search
USPC ................... 348/42, 46, 47, 51; 382/103, 154
See application file for complete search history.

(56) References Cited

U.S. PATENT DOCUMENTS

| 7,486,311 B2 | 2/2009 | Baker et al. |
| 7,756,297 B2 | 7/2010 | Pryor |
| 7,773,799 B2 | 8/2010 | Oldroyd |
| 7,804,530 B2 | 9/2010 | Pryor |
| 7,804,585 B2 | 9/2010 | Tropf |
| 7,805,220 B2 | 9/2010 | Taylor et al. |
| 7,822,267 B2 | 10/2010 | Gu |
| 7,835,568 B2 | 11/2010 | Park et al. |
| 7,903,857 B2 * | 3/2011 | Huang et al. ................. 382/131 |
| 7,912,633 B1 | 3/2011 | Dietsch et al. |
| 8,204,299 B2 * | 6/2012 | Arcas et al. .................... 382/154 |
| 2006/0203085 A1 * | 9/2006 | Tomita .............................. 348/51 |
| 2006/0210111 A1 * | 9/2006 | Cleveland et al. ............ 382/103 |
| 2009/0196491 A1 | 8/2009 | Stainlay et al. |

(Continued)

FOREIGN PATENT DOCUMENTS

| JP | 10-132562 A | 5/1998 |
| JP | 10-336703 A | 12/1998 |

(Continued)

OTHER PUBLICATIONS

International Search Report, mailed Oct. 2, 2012, PCT International App. No. PCT/JP2012/067252, Sharp Kabushiki Kaisha, 5 pgs.

*Primary Examiner* — Gregory M Desire
(74) *Attorney, Agent, or Firm* — Chernoff Vilhauer McClung & Stenzel, LLP

(57) ABSTRACT

A mobile device including an imaging device with a display and capable of obtaining a pair of images of a scene having a disparity between the pair of images. The imaging device estimating the distance between the imaging device and a point in the scene indicated by a user on the display. The imaging device displaying the scene on the display together with an indication of a geometric measure.

27 Claims, 13 Drawing Sheets

(56) References Cited

U.S. PATENT DOCUMENTS

| | | |
|---|---|---|
| 2009/0256809 A1* | 10/2009 | Minor .......................... 345/173 |
| 2009/0296984 A1 | 12/2009 | Nijim et al. |
| 2011/0130949 A1* | 6/2011 | Arrasvuori .................... 701/200 |
| 2011/0193857 A1* | 8/2011 | Filippov et al. ............... 345/419 |
| 2011/0293142 A1* | 12/2011 | van der Mark et al. ....... 382/103 |
| 2012/0009981 A1* | 1/2012 | Bengtsson .................... 455/566 |
| 2012/0098938 A1* | 4/2012 | Jin ................................. 348/47 |
| 2012/0105581 A1* | 5/2012 | Berestov et al. ................ 348/43 |
| 2012/0140038 A1* | 6/2012 | Bi et al. .......................... 348/46 |
| 2012/0154378 A1* | 6/2012 | Kitchens ....................... 345/419 |
| 2012/0200670 A1* | 8/2012 | Pockett ........................... 348/46 |
| 2013/0004058 A1* | 1/2013 | Pan et al. ...................... 382/154 |

FOREIGN PATENT DOCUMENTS

| | | |
|---|---|---|
| JP | 2000-293784 A | 10/2000 |
| JP | 2001-124544 A | 5/2001 |
| JP | 2007-274724 A | 10/2007 |

* cited by examiner

MOBILE THREE DIMENSIONAL IMAGING SYSTEM

CROSS-REFERENCE TO RELATED APPLICATIONS

None.

BACKGROUND OF THE INVENTION

Many mobile devices, such as cellular phones and tablets, include cameras to obtain images of scenes. Such mobile devices are convenient for acquiring images since they are frequently used for other communications, the image quality is sufficient for many purposes, and the acquired image can typically be shared with others in an efficient manner. The three dimensional quality of the scene is apparent to the viewer of the image, while only two dimensional image content is actually captured.

Other mobile devices, such as cellular phones and tablets, with a pair of imaging devices are capable of obtaining images of the same general scene from slightly different viewpoints. The acquired pair of images obtained from the pair of imaging devices of generally the same scene may be processed to extract three dimensional content of the image. Determining the three dimensional content is typically done by using active techniques, passive techniques, single view techniques, multiple view techniques, single pair of images based techniques, multiple pairs of images based techniques, geometric techniques, photometric techniques, etc. In some cases, object motion is used to for processing the three dimensional content. The resulting three dimensional image may then be displayed on the display of the mobile device for the viewer. This is especially suitable for mobile devices that include a three dimensional display.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
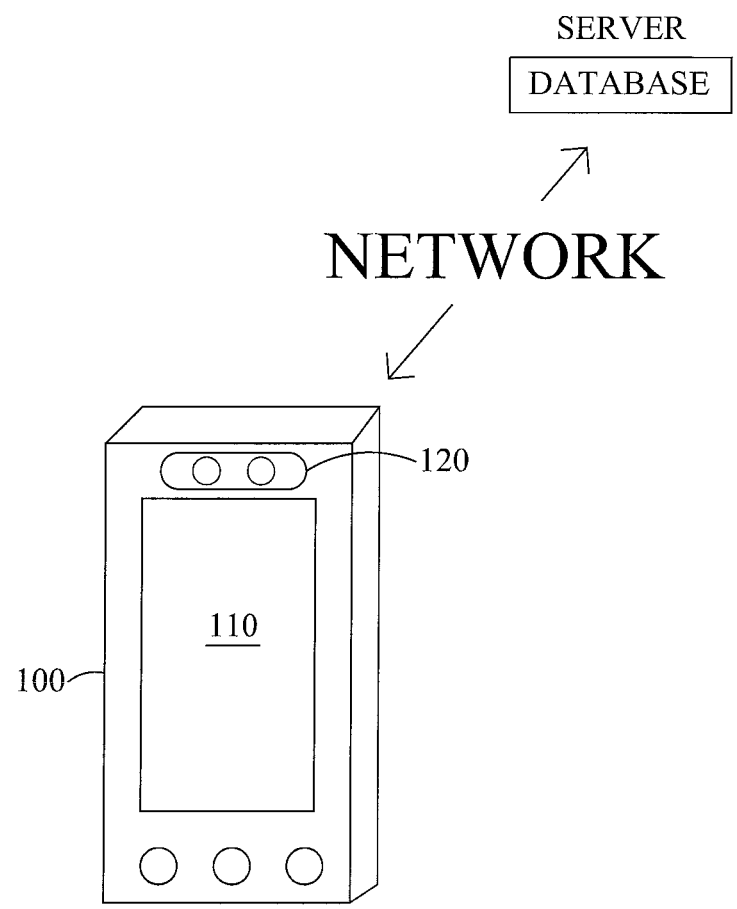
FIG. 1 illustrates a mobile device with a pair of imaging devices.

Referring to FIG. 1, a mobile device 100 such as a cellular device or tablet, may include display 110 incorporated therewith that is suitable for displaying images thereon. In addition, the mobile device may include a keyboard for data entry, such as a physical keyboard and/or a virtual on-screen keyboard. The mobile device may include one or more imaging devices 120 with one or more lenses, together with associated circuitry to acquire at least a pair of images from which a stereoscopic scene can be determined.

Figure 2:
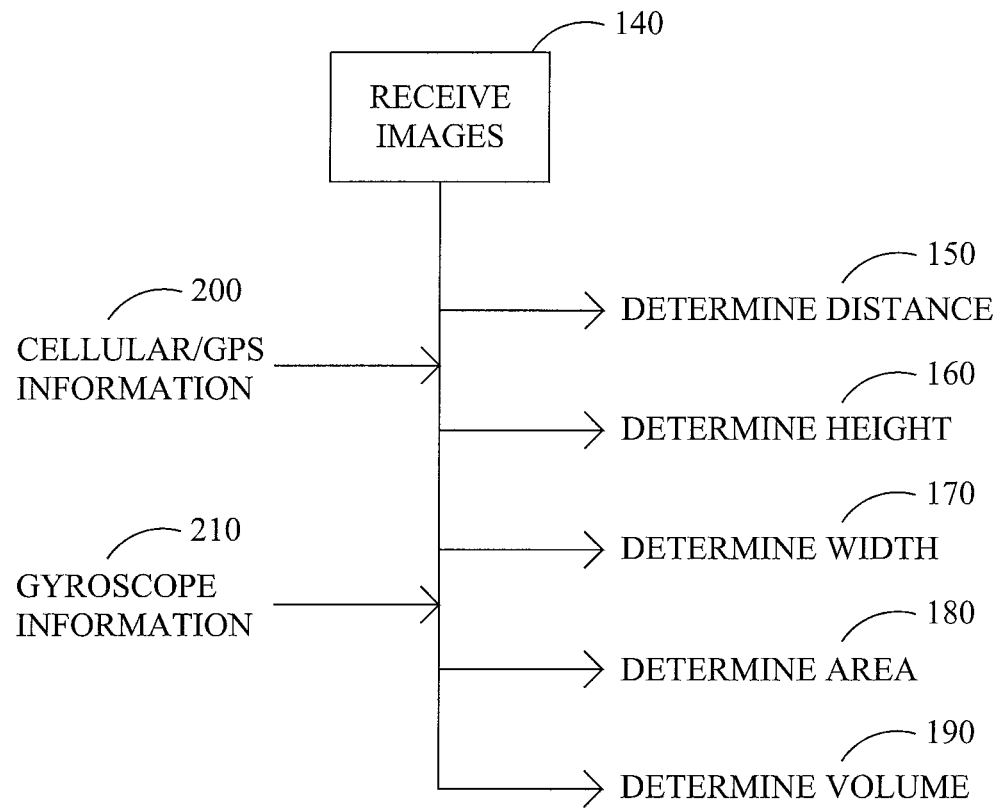
FIG. 2 illustrates image processing.

Referring to FIG. 2, the mobile device may include software (or otherwise) that processes a pair of images 140 acquired from the imaging device (including one or more image capture devices) to obtain stereoscopic image data which may be used for further applications or otherwise for presentation on the display. Preferably, the display 110 is a stereoscopic display. Based upon the image content obtained, the mobile device may determine properties of the scene, such as for example, the distance to one or more points in the scene 150, the height of one or more objects in the scene 160, the width of one or more objects in the scene 170, the area of one or more objects in the scene 180, and/or the volume of one or more objects in the scene 190. To further refine the determined properties, the mobile device may make use of GPS information 200 in making determinations and/or gyroscope information 210 in making determinations. Further, by having such functionality included together with a mobile device it is especially versatile and portable, being generally available when the mobile device is available.

While the determination of one or more properties of a three-dimensional scene by a mobile device is advantageous, it is further desirable that the selection of the determination be suitable for a pleasant user experience. For example, the user preferably interacts with a touch screen display on the mobile device to indicate the desired action. In addition, the mobile device may include two-way connectivity to provide data to, and receive data in response thereto, a server connected to a network. The server may include, for example, a database and other processing capabilities. In addition, the mobile device may include a local database together with processing capabilities.

Figure 3:
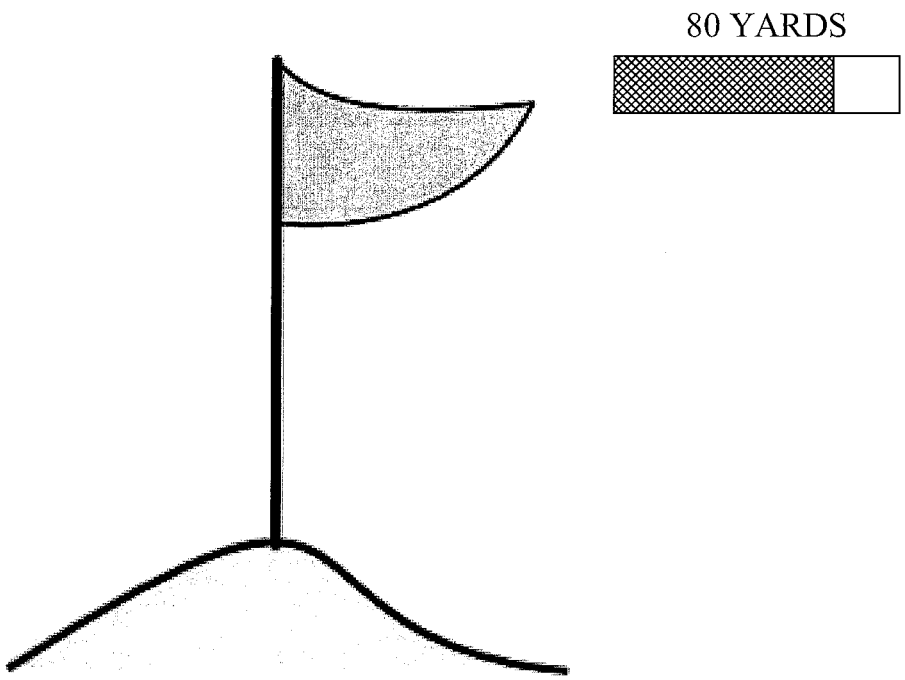
FIG. 3 illustrates a golf course together with distance and an error indication.

Referring to FIG. 3, for example, during a round of golf it is desirable to be able to estimate the distance to the next pin, a tree, or other location of interest. For example, the location of interest may be the desired location for the ball to be hit to. By aligning the imaging device of the mobile device at the location of interest, the mobile device may determine the distance to the particular location. While many different locations may be within the view of the imaging device, the user may indicate the desired location by touching the screen at the location of particular interest. In this case, the user may identify on the display a flag, a tree, a sand trap, a lake, or other location of interest. In many cases, the location of interest is a flag, a tree, a sand trip, a lake, and thus the mobile device may use a pattern matching or other technique to further identify more precisely the location of interest. The mobile device may then determine the distance to the particular location of interest based upon the processing of the received images. The mobile device may likewise use the gyroscope to further estimate the elevation change to the location of interest.

To further assist the system in determining the location of interest, a golf course database located on the mobile device and/or available through a network, may be used to further refine the location of interest. For example, by using cellular triangulation techniques and/or GPS location techniques, the location of the mobile device may be identified which may be matched to the particular golf course, the particular hole of interest, and/or the likely objects within the field of view of the mobile device. Thus, additional informational data from the database may be used to further refine the data of the distance and/or elevation change to the location of interest. Further, the mobile device may obtain temporally relevant weather data to obtain information regarding wind conditions for the golf course. In addition, information regarding the mobile device location may be used to verify the location of the anticipated object of interest to further verify that the data calculation is likely accurate. This data may be presented to the user of the mobile device, together with a suggestion of an appropriate golf club, for the user to make their next shot on the golf course.

Figure 4:
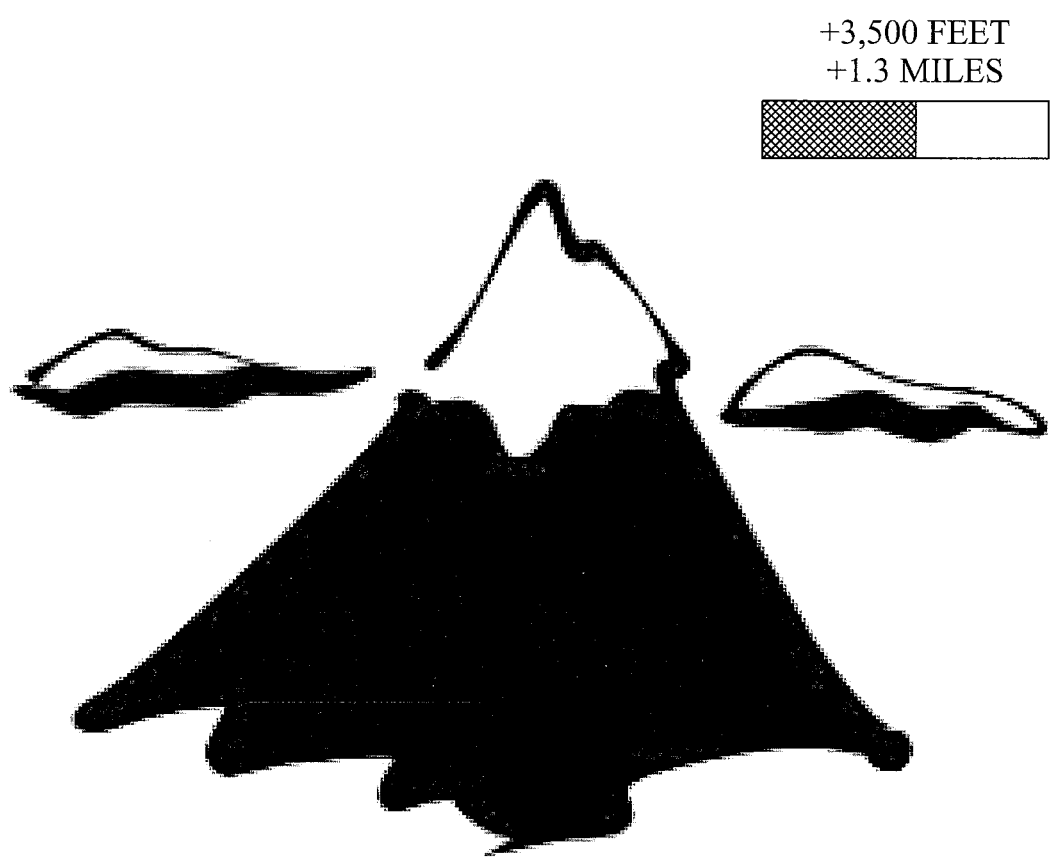
FIG. 4 illustrates a mountain together with distance, elevation, and an error indication.

Referring to FIG. 4, for example, while traveling it may be desirable to be able to determine the absolute height and/or relative height of an object of interest in the distance, such as a large building or a mountain. For example, the location of interest may be the desired location for a trip. By aligning the imaging device of the mobile device at the location of interest, the mobile device may determine the distance to the particular location. While many different locations may be within the view of the imaging device, the user may indicate the desired location by touching the screen at the location of particular interest. In this case, the user may identify on the display a building, a mountain, or other location of interest. In many cases, the location of interest is a building, a mountain, or otherwise, and thus the mobile device may use a image processing technique to further identify the likely top of the location of interest. The mobile device may then determine the distance to the particular location of interest based upon the processing of the received images. The mobile device may likewise determine the absolute elevation and/or the relative elevation to the location of interest. The mobile device may likewise use the gyroscope and/or the GPS to further estimate the elevation change to the location of interest.

To further assist the system in determining the location of interest, a map database of geographic features located on the mobile device and/or available through a network, may be used to further refine the location of interest. For example, by using cellular triangulation techniques and/or GPS location techniques, the location of the mobile device may be identified which may be matched to the particular regions of interest. Thus, additional informational data from the database may be used to further refine the data on the distance and/or elevation change to the location of interest. In addition, information regarding the mobile devices location may be used to verify the anticipated object of interest to further verify that the data calculation is likely accurate. This data may be presented to the user of the mobile device, together with a suggestion of the distance and/or height of the object of interest.

Figure 5:
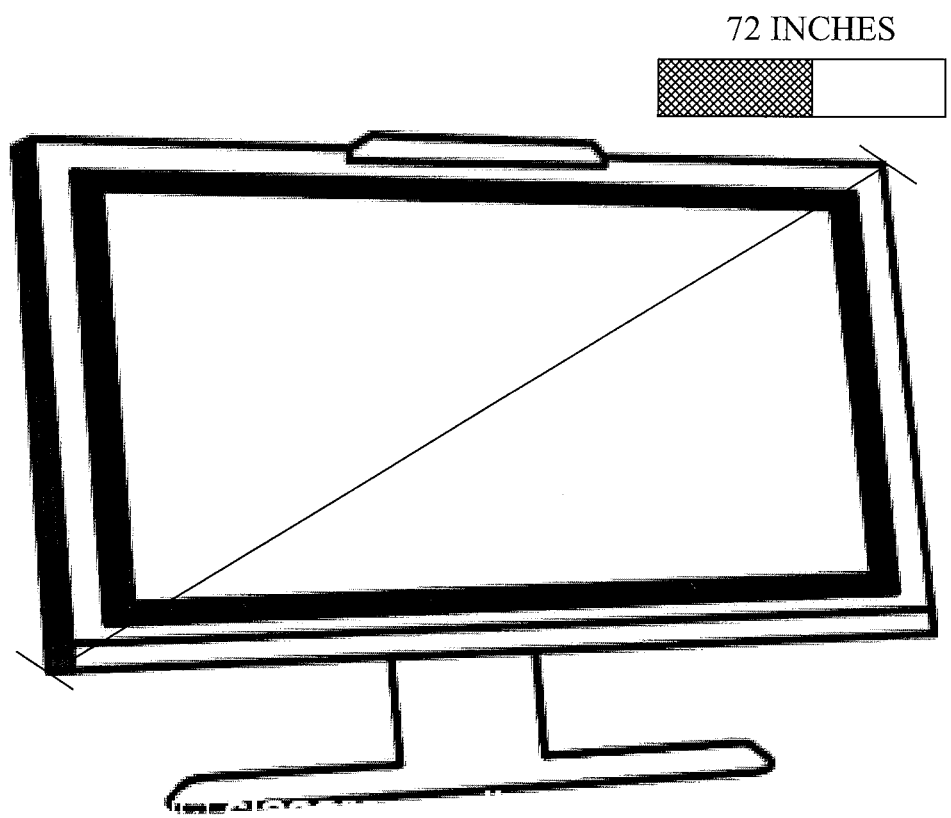
FIG. 5 illustrates a television together with length, and an error indication.

Referring to FIG. 5, for example, while in a store or other location it may be desirable to be able to determine the size of an object of interest, such as the diagonal length of a television. By aligning the imaging device of the mobile device at the location of interest, the mobile device may determine the distance to the particular location. While many different locations may be within the view of the imaging device, the user may indicate the desired location by touching the screen at the location of particular interest. In this case, the user may identify on the display an object of interest, and if desired a region and direction for the length on the object of interest. In many cases, the object of interest is contrasted against a background, or otherwise, and thus the mobile device may use an image processing technique to further identify the likely edges of the location of interest. The mobile device may then determine the length of the particular location of interest based upon the processing of the received images. The mobile device may likewise use the gyroscope and/or the GPS to further estimate the length of the location of interest.

To further assist the system in determining the length of the item of interest, a database located on the mobile device and/or available through a network, may be used to further refine the location of interest. For example, by using cellular triangulation techniques and/or GPS location techniques, the location of the mobile device may be identified which may be matched to the particular regions of interest. Thus, additional informational data from the database may be used to further refine the data on the length of the location of interest. This is especially suitable for relatively long lengths. In addition, information regarding the mobile devices location may be used to verify the anticipated object of interest to further verify that the data calculation is likely accurate. This data may be presented to the user of the mobile device, together with a suggestion of the distance and/or length of the object of interest.

Figure 6:
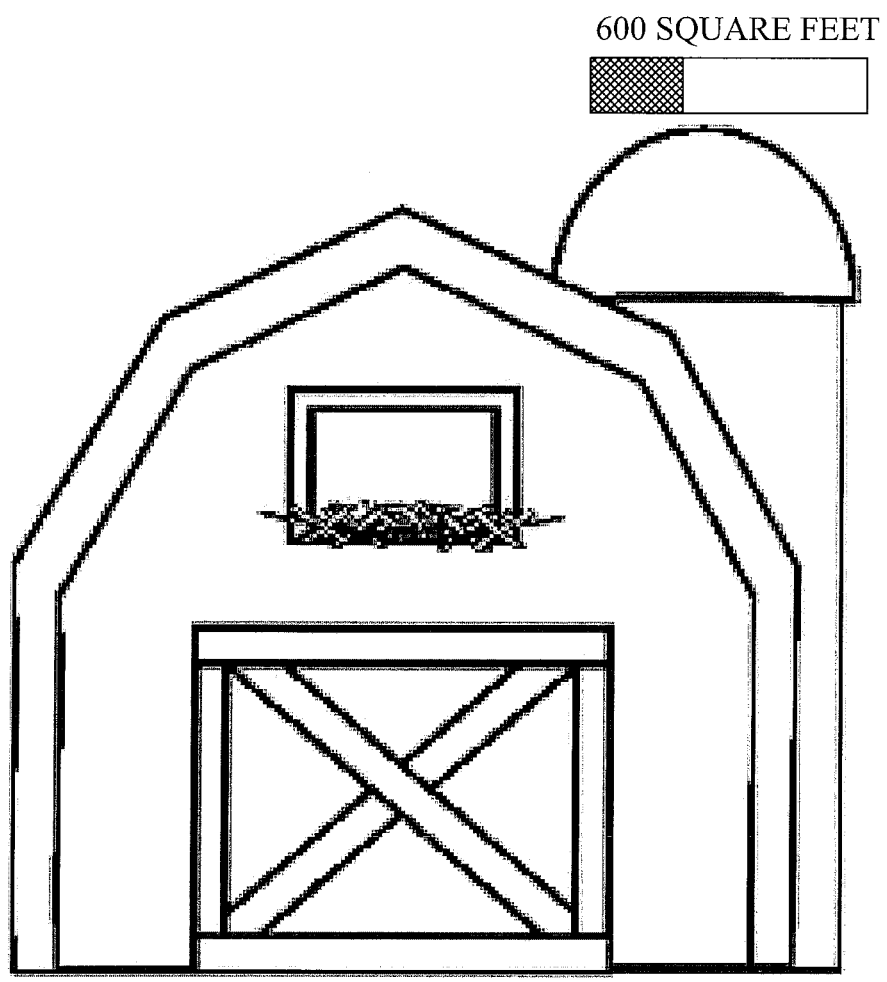
FIG. 6 illustrates a barn together with square feet and an error indication.

Referring to FIG. 6, for example, while viewing a pasture, a barn, or an unpainted wall it may be desirable to be able to determine the surface area of an object of interest, such as the square footage of a wall of a building. By aligning the imaging device of the mobile device at the location of interest, the mobile device may determine the distance to the particular location together with its boundaries, and then determine its surface area. While many different locations may be within the view of the imaging device, the user may indicate the desired location by touching the screen at the location of particular interest. In this case, the user may identify on the display an object of interest, and if desired a region of the object of interest. In many cases, the object of interest is contrasted against a background, or otherwise, and thus the mobile device may use an image processing technique to further identify the likely edges of the location of interest so the surface area region may be determined. The mobile device may then determine the surface area of the particular location of interest based upon the processing of the received images. The mobile device may likewise use the gyroscope and/or the GPS to further estimate the length of the location of interest.

To further assist the system in determining the surface area of the item of interest, a database located on the mobile device and/or available through a network, may be used to further refine the location of interest. For example, by using cellular triangulation techniques and/or GPS location techniques, the location of the mobile device may be identified which may be matched to the particular regions of interest. Thus, additional informational data from the database may be used to further refine the data on the area of the location of interest. This is especially suitable for relatively large areas. In addition, information regarding the mobile devices location may be used to verify the anticipated object of interest to further verify that the data calculation is likely accurate. This data may be presented to the user of the mobile device, together with a suggestion of the area of the surface of the object of interest.

Figure 7:
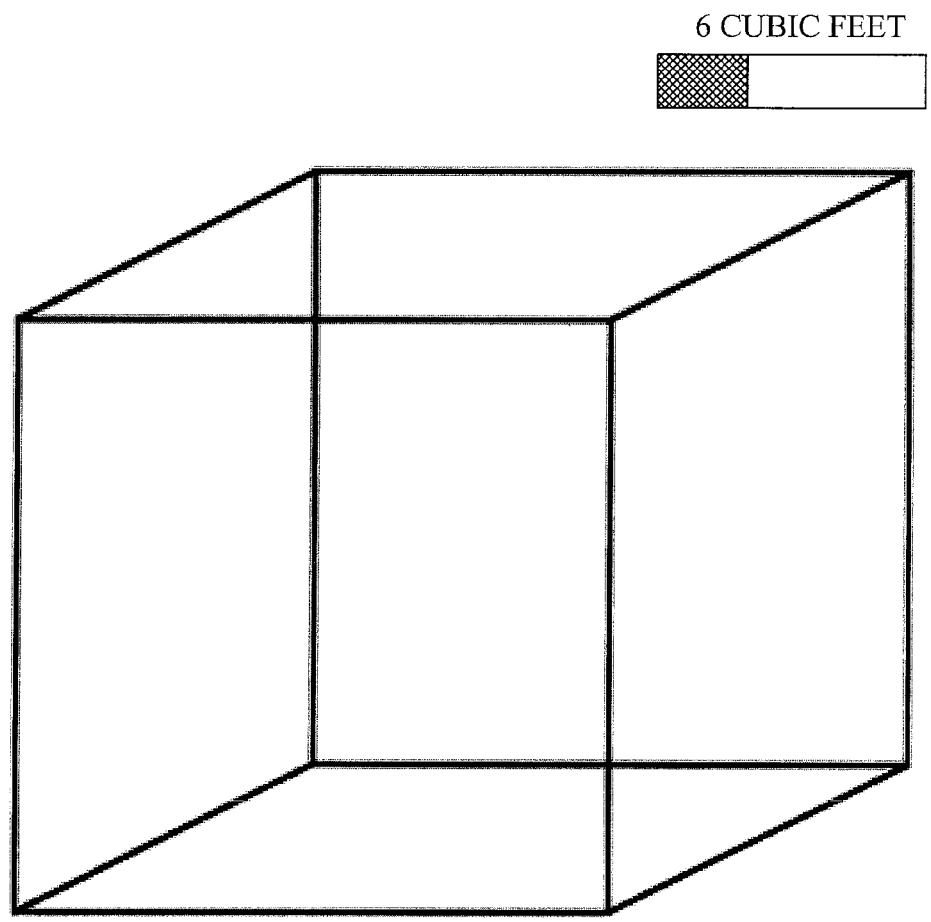
FIG. 7 illustrates a cube together with volume and an error indication.

Referring to FIG. 7, for example, while viewing a three dimensional object, such as a box or a structure, it may be desirable to be able to determine the volume of the object of interest, such as the cubic footage. By aligning the imaging device of the mobile device at the location of interest, the mobile device may determine the volume of the particular object based upon its boundaries. While many different locations may be within the view of the imaging device, the user may indicate the desired location by touching the screen at the location of particular interest. In this case, the user may identify on the display an object of interest, and if desired a region of the object of interest. In many cases, the object of interest is contrasted against a background, or otherwise, and thus the mobile device may use an image processing technique to further identify the likely edges of the location of interest so the volume may be determined. The mobile device may likewise use the gyroscope and/or the GPS to further estimate the length of the location of interest.

To further assist the system in determining the volume of the item of interest, a database located on the mobile device and/or available through a network, may be used to further refine the location of interest. For example, by using cellular triangulation techniques and/or GPS location techniques, the location of the mobile device may be identified which may be matched to the particular regions of interest. Thus, additional informational data from the database may be used to further refine the data on the area of the location of interest. This is especially suitable for relatively large volumes. In addition, information regarding the mobile devices location may be used to verify the anticipated object of interest to further verify that the data calculation is likely accurate. This data may be presented to the user of the mobile device, together with a suggestion of the volume of the object of interest.

As illustrated in FIGS. 3, 4, 5, 6, and 7 the system may also include an estimated error measure providing an indication of the estimated accuracy of the acquired data. This measure may be a graphical color bar, or any other suitable measure, to provide some type of confidence measure to the user. In this manner, the user is able to make a determination regarding the accuracy of the data and to what degree it should be relied upon.

Figure 8:
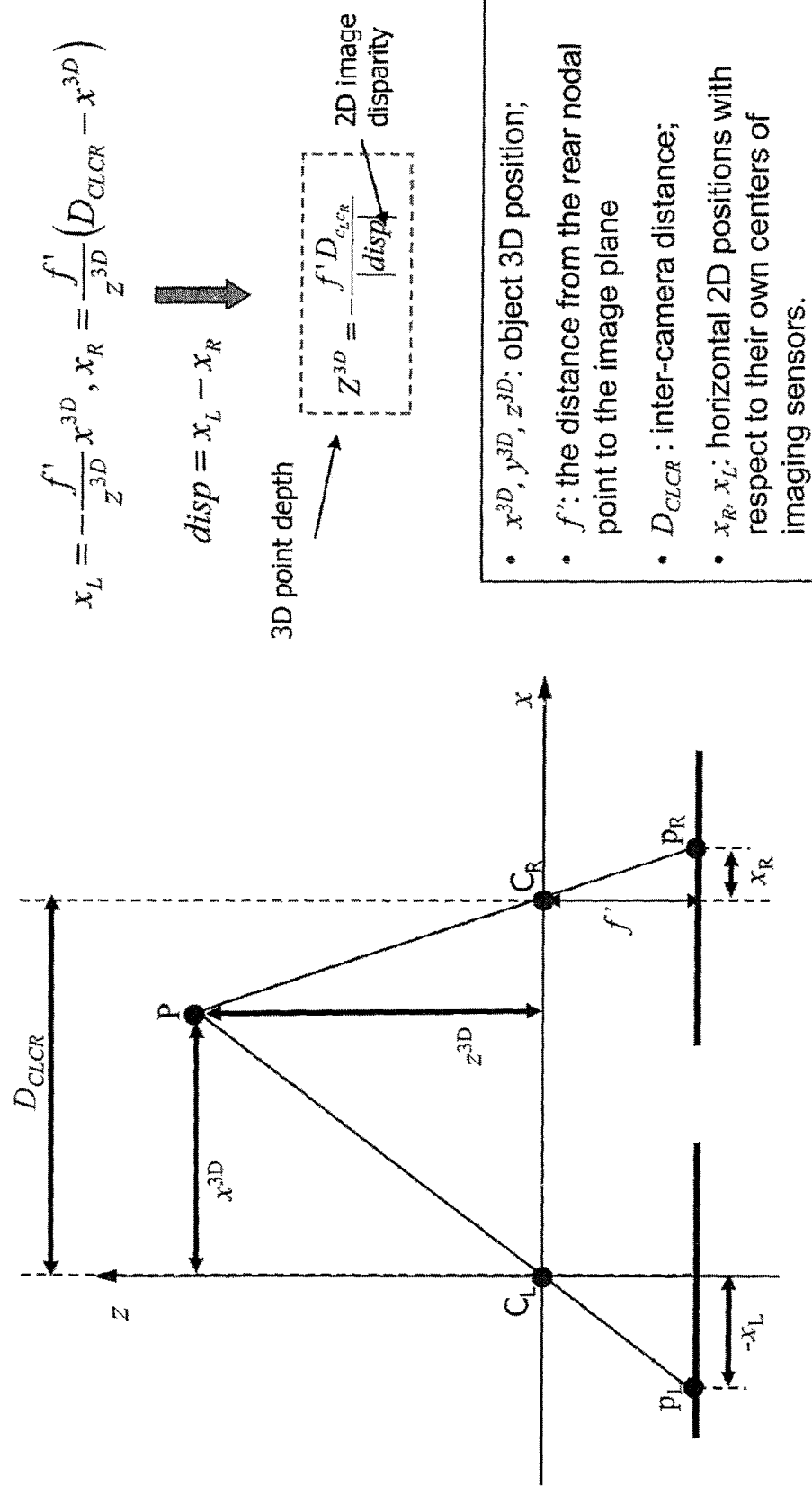
FIG. 8 illustrates depth determination.

Referring to FIG. 8, the three dimensional depth may be determined in any suitable manner. One embodiment is to use a pair of cameras which have parallel optical axes and share the same imaging sensor. In this case, the, the three-dimensional depth ($Z^{3D}$) is inversely proportion to the two-dimensional disparity (e.g., disp). With a pair of cameras having parallel optical axes (for simplicity purposes) the coordinate system may be referenced to the left camera. The result of the determination is an estimated depth of the position P in the image. The process may be repeated for a plurality of different points in the image.

Figure 9:
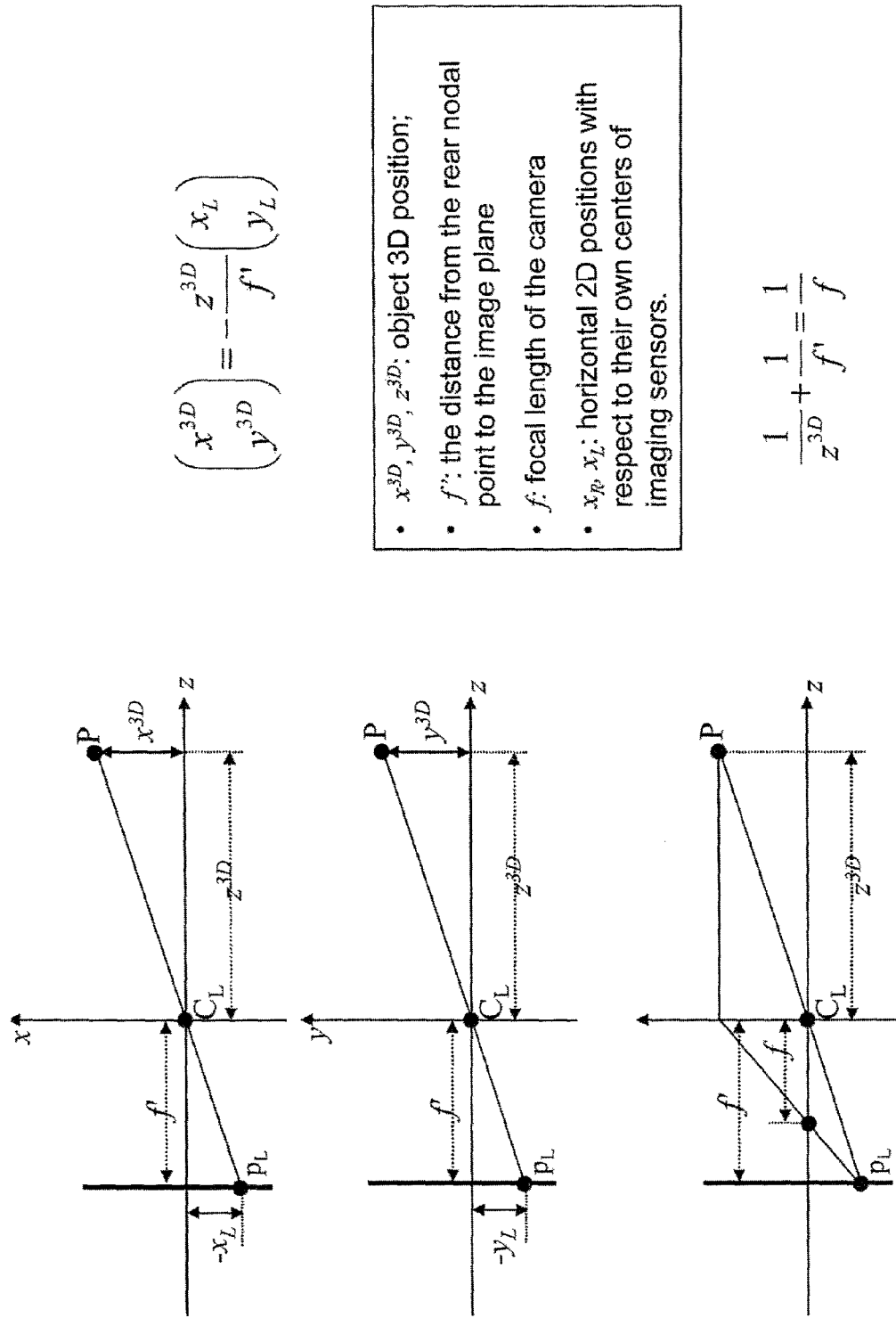
FIG. 9 illustrates x, y, z coordinate determination.

Referring to FIG. 9, the three dimensional coordinates of the object of interest (namely, x, y, and z) may be determined in any suitable manner. The process may be repeated for a plurality of different points in the image. Accordingly, based upon this information, the distance, length, surface area, volume, etc. may be determined for the object of interest.

Figure 12:
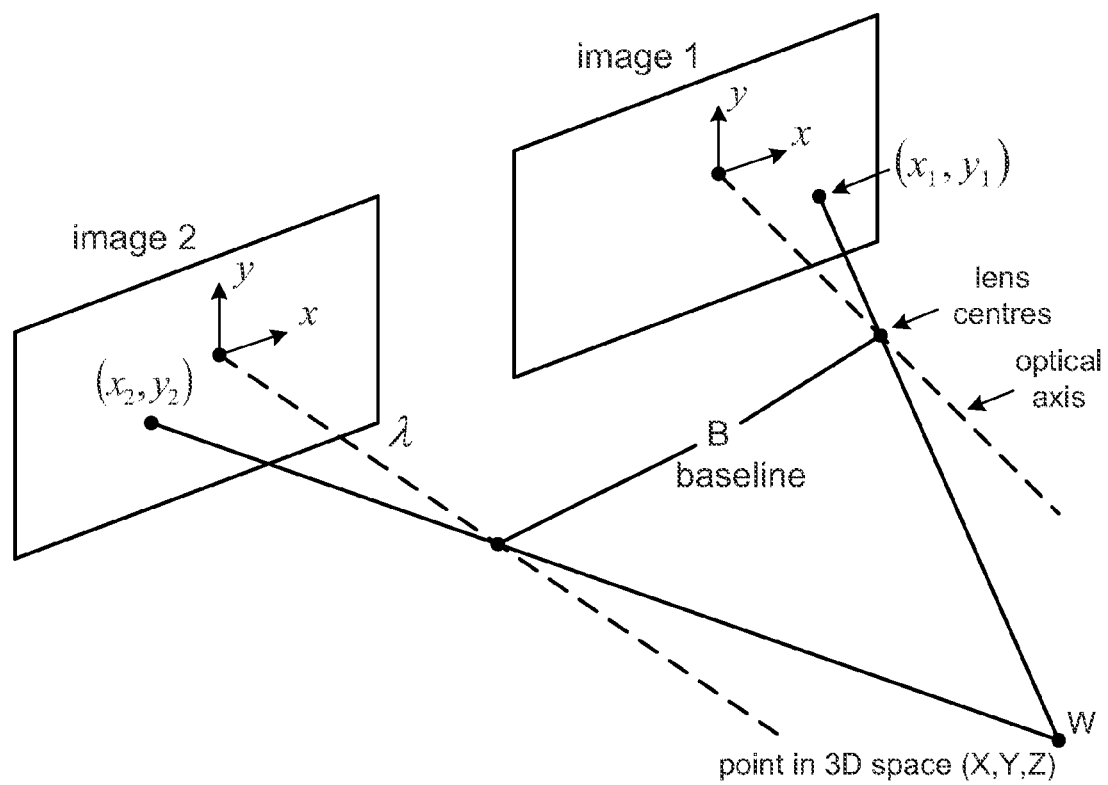
FIG. 12 illustrates a pair of cameras with non-parallel axes.

Referring to FIG. 12, another embodiment uses a pair of cameras with non-parallel camera axes. The optical axes of the cameras are either converging or diverging. The 3D coordinates of the matched image points are computed as intersection point of 3D rays extended from the original 2D pixels in each image. This process may be referred to as "triangulation".

Figure 10:
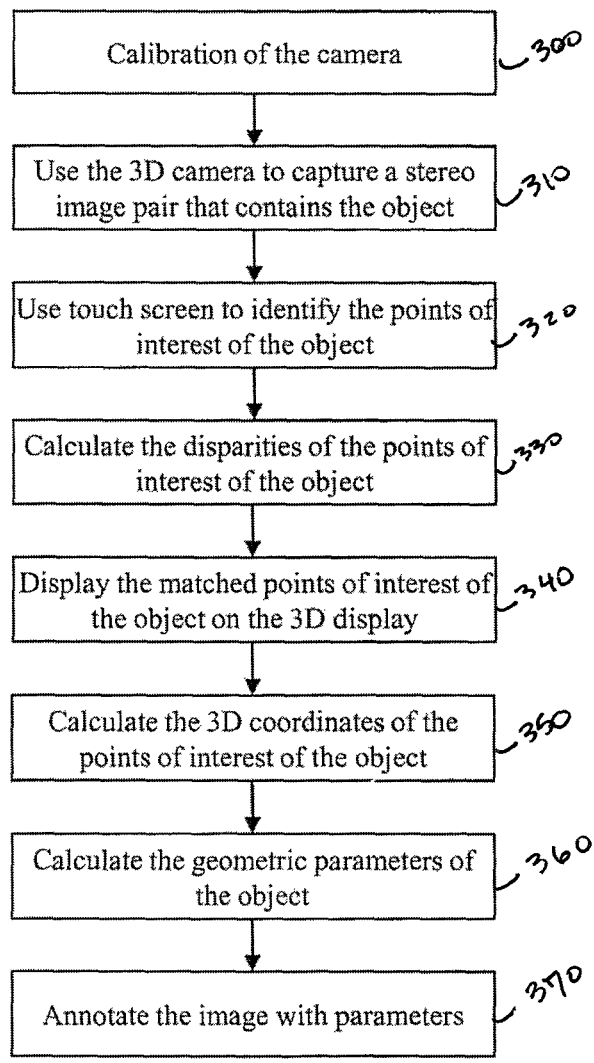
FIG. 10 illustrates an embodiment for geometric parameter determination.

Referring to FIG. 10, an exemplary embodiment of the use of a system is illustrated where the user selects the point(s) of interest. Preferably, by using a calibrated camera 300, a stereo image pair of obtained 310 that includes the object. The user may touch the screen to identify the points of interest of the object 320. Based upon the identified points, the system may calculate the disparities of the points of interest of the object 330. If desired, the matched points of interest may be displayed on the display 340. In addition, the system may calculate the three dimensional coordinates of the points of interest of the object 350. With the coordinates calculated 350, the system may calculate the geometric parameters of the object 360. The image parameters 360 may be provided to the user 370, together with the image, if desired.

There are a number of techniques suitable for touching the display and selecting a point of interest. In a one embodiment, the user touches a 2D image shown on the screen. The 2D image can be captured by the left camera and/or the right camera. If the user touches a point on the 2D image from the left camera, the disparity estimation technique is used to compute the corresponding point in the right image. Similarly, if the user touches a point on the 2D image from the right camera, the disparity estimation technique is applied to find its corresponding point in the left image. After this, a pair of matching points are then selected for the 3D coordinate estimation.

Another embodiment for selecting points of interest is to extract a number of interest points automatically from each image and draw the points along with the left and/or right view on the screen. Then if the user touched point is close to one of the existing interest points, that particular point is assumed to be selected. Then the disparity estimation technique is applied to find the corresponding point in the other image.

Figure 11:
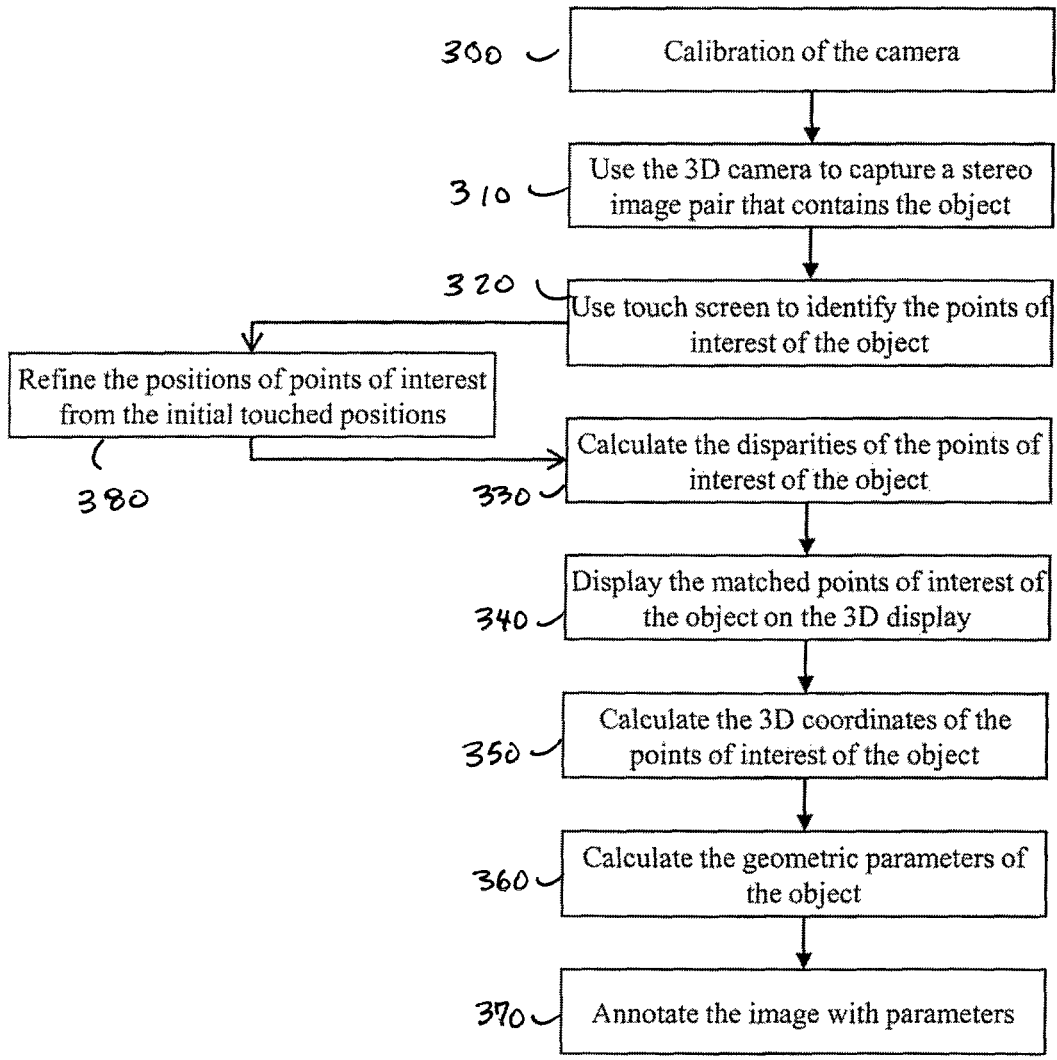
FIG. 11 illustrates another embodiment for geometric parameter determination.

Referring to FIG. 11, a further embodiment permits the user and/or system to refine the positions of the points of interest based upon the initial touched positions 380. In this manner, a refinement of the positions may be determined.

A relative measurement error value of the computed 3D coordinates can be predicted for each measurement and visualized on the image, to indicate how reliable the estimated 3D coordinate values are. It can be represented as a percentage relative to the original absolute value, e.g., +/−5% of 5 meters. One embodiment of the 3D measurement error is derived from the original 2D image matching score generated by the disparity estimation algorithm:

$$100\% * (\text{MaxMatchingScore} - \text{CurrentMatchingScore}) / \text{MaxMatchingScore}$$

In this manner, if the disparity estimation results are improved, the real 2D image matching score will be closer to the maximum matching score, and the relative 3D geometry measurement error will be smaller. Conversely, if the 2D image matching score by the disparity estimation technique is lower, the predicted relative 3D geometry measurement error will be larger.

Figure 13:
FIG. 13 illustrates a pair of images from two captured images displayed side by side.

Referring to FIG. 13, the estimated measurement results may be overlaid onto the images on the screen. One embodiment is to show both the left and the right 2D images side by side on the screen and draw the measurement values and graphical elements (such as arrow and cross) on both images Another embodiment is to show the measurement results in 3D images on the screen. The computed 3D distance from the matched points of interest are used to align the numbers and graphics to the correct 3D position. For example, the result text "distance: 3 meters" could be drawn in front of the selected point of interest at the 3D distance of 2.5 meters. In other words, the graphics should be placed in front of the original 3D images.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A mobile device comprising:

(a) an imaging device with a display and at least one sensor capable of obtaining a pair of images of a scene having a disparity between said pair of images, and rendering said scene on said display;
(b) a processor of said imaging device capable of receiving a user's selection of an object in the rendered said scene;
(c) a positioning device operatively connected to said processor and capable of determining a location of said mobile device, where said processor is capable of using the determined location and the rendered said scene to associate the rendered said scene with information in a database remote from said mobile device;
d) where said processor is capable of jointly processing said image and processing said information to determine a feature related to the selected said object.

2. The mobile device of claim 1 wherein said feature is an approximate distance to the selected said object from said mobile device.

3. The mobile device of claim 1 wherein said feature relates to the geometry of the selected said object.

4. The mobile device of claim 1 wherein said point in said scene is selected in a first image of said pair of images, and its corresponding point is determined in a second image of said pair of images.

5. The mobile device of claim 1 wherein said imaging device wherein said indicated by said user on said display is further modified based upon a set of points of interest computed based on the image content.

6. The mobile device of claim 1 further determines a relative three dimensional measurement error indicating the reliability of 3D coordinate values.

7. The mobile device of claim 1 wherein said imaging device includes a pair of cameras.

8. The mobile device of claim 7 wherein said pair of cameras have parallel axes.

9. The mobile device of claim 7 wherein said pair of cameras have converging axes.

10. The mobile device of claim 7 wherein said pair of cameras have diverging axes.

11. The mobile device of claim 1 further determines a relative three dimensional measurement error that is visualized in both a two-dimensional left view image and a two-dimensional right view image.

12. The mobile device of claim 1 further determines a relative three dimensional measurement error that is visualized in a three dimensional manner, appearing virtually in front of object in said scene.

13. The mobile device of claim 1 wherein said feature is a length of at least a portion of said object.

14. The mobile device of claim 13 wherein said estimation is further based upon location data.

15. The mobile device of claim 13 wherein said estimation is further based upon gyroscopic data.

16. The mobile device of claim 1 wherein said feature is a distance.

17. The mobile device of claim 16 wherein said estimation is further based upon location data.

18. The mobile device of claim 16 wherein said estimation is further based upon gyroscopic data.

19. The mobile device of claim 1 wherein said imaging device estimating an area of a portion of an object in said scene and said feature is an area.

20. The mobile device of claim 19 wherein said estimation is further based upon location data.

21. The mobile device of claim 19 wherein said estimation is further based upon gyroscopic data.

22. The mobile device of claim 1 wherein said imaging device estimating a volume of a portion of an object in said scene and said feature is a volume.

23. The mobile device of claim 22 wherein said estimation is further based upon location data.

24. The mobile device of claim 22 wherein said estimation is further based upon gyroscopic data.

25. The mobile device of claim 1 wherein said imaging device estimating an elevation of a portion of an object in said scene and said feature is an elevation.

26. The mobile device of claim 25 wherein said estimation is further based upon location data.

27. The mobile device of claim 25 wherein said estimation is further based upon gyroscopic data.

* * * * *